United States Patent
Stewart et al.

(10) Patent No.: US 12,147,763 B2
(45) Date of Patent: *Nov. 19, 2024

(54) SYSTEM AND METHOD FOR IDENTIFYING SENTIMENT IN TEXT STRINGS

(71) Applicant: MEDALLIA, INC., San Francisco, CA (US)

(72) Inventors: Gregor Stewart, San Mateo, CA (US); Tzu-Ting Kuo, San Mateo, CA (US); Andrew Yeager, San Mateo, CA (US)

(73) Assignee: Medallia, Inc., San Francisco, CA (US)

( * ) Notice: Subject to any disclaimer, the term of this patent is extended or adjusted under 35 U.S.C. 154(b) by 789 days.

This patent is subject to a terminal disclaimer.

(21) Appl. No.: 17/216,048

(22) Filed: Mar. 29, 2021

(65) Prior Publication Data

US 2021/0216708 A1   Jul. 15, 2021

Related U.S. Application Data

(63) Continuation of application No. 16/297,137, filed on Mar. 8, 2019, now Pat. No. 10,963,639.

(51) Int. Cl.
| | |
|---|---|
| *G06F 40/30* | (2020.01) |
| *G06F 16/904* | (2019.01) |
| *G06F 16/906* | (2019.01) |
| *G06F 40/216* | (2020.01) |
| *G06F 40/253* | (2020.01) |
| *G06N 20/00* | (2019.01) |

(52) U.S. Cl.
CPC .......... *G06F 40/253* (2020.01); *G06F 16/904* (2019.01); *G06F 16/906* (2019.01); *G06F 40/216* (2020.01); *G06N 20/00* (2019.01)

(58) Field of Classification Search
CPC ..................................................... G06F 40/30
See application file for complete search history.

(56) References Cited

U.S. PATENT DOCUMENTS

| | | | | |
|---|---|---|---|---|
| 7,117,518 | B1* | 10/2006 | Takahashi | H04N 21/44222 725/86 |
| 8,554,701 | B1* | 10/2013 | Dillard | G06F 40/30 706/12 |
| 8,799,387 | B2* | 8/2014 | Alspector | H04L 51/212 709/206 |
| 9,336,268 | B1* | 5/2016 | Moudy | G06F 40/30 |
| 10,250,851 | B1* | 4/2019 | Harpur | G06V 40/174 |
| 10,877,982 | B1* | 12/2020 | De Boursetty | G06F 16/9535 |
| 10,990,760 | B1* | 4/2021 | Monnett | G06F 40/295 |
| 11,361,337 | B2* | 6/2022 | Gupta | G06Q 30/0224 |
| 2009/0319342 | A1* | 12/2009 | Shilman | G06Q 30/02 705/7.41 |
| 2013/0138577 | A1* | 5/2013 | Sisk | G06Q 40/04 705/36 R |
| 2013/0297546 | A1* | 11/2013 | Woods-Holder | G06F 40/211 706/46 |
| 2015/0066814 | A1* | 3/2015 | Allen | G06F 40/30 706/11 |
| 2015/0248424 | A1* | 9/2015 | Berube | G06F 16/93 715/234 |
| 2015/0302304 | A1* | 10/2015 | Monden | G06F 40/169 706/12 |

(Continued)

*Primary Examiner* — Lamont M Spooner

(57) ABSTRACT

Embodiments discussed herein refer to systems and methods for identifying relevantly similar sentiment in text strings.

18 Claims, 9 Drawing Sheets

(56) References Cited

U.S. PATENT DOCUMENTS

| | | | | |
|---|---|---|---|---|
| 2016/0055235 A1* | 2/2016 | Zhang | G06F 40/242 | |
| | | | 707/749 | |
| 2016/0072903 A1* | 3/2016 | Chakra | H04L 51/52 | |
| | | | 704/9 | |
| 2016/0085855 A1* | 3/2016 | Clark | G06F 40/211 | |
| | | | 707/739 | |
| 2016/0086196 A1* | 3/2016 | Clark | G06F 16/285 | |
| | | | 705/7.29 | |
| 2016/0098480 A1* | 4/2016 | Nowson | G06F 40/30 | |
| | | | 707/738 | |
| 2016/0274705 A1* | 9/2016 | Kapadia | A63F 13/60 | |
| 2017/0213138 A1* | 7/2017 | Bojja | G06N 20/00 | |
| 2017/0220677 A1* | 8/2017 | Kazi | H04L 67/53 | |
| 2018/0018321 A1* | 1/2018 | Jones | G06F 40/30 | |
| 2018/0032610 A1* | 2/2018 | Cameron | G10L 15/18 | |
| 2018/0218430 A1* | 8/2018 | Prendki | G06Q 30/0641 | |
| 2018/0260860 A1* | 9/2018 | Devanathan | G06F 16/353 | |
| 2018/0285345 A1* | 10/2018 | Pradhan | G06F 40/30 | |
| 2018/0317831 A1* | 11/2018 | Anderson | A61B 5/002 | |
| 2019/0087767 A1* | 3/2019 | Lu | G06F 21/6218 | |
| 2019/0197119 A1* | 6/2019 | Zhang | G06F 16/35 | |
| 2019/0236645 A1* | 8/2019 | Kamma | G06N 3/08 | |
| 2019/0251152 A1* | 8/2019 | Leydon | G06F 40/30 | |
| 2019/0252059 A1* | 8/2019 | Gleason | G06N 5/048 | |
| 2019/0295533 A1* | 9/2019 | Wang | G10L 15/22 | |
| 2019/0340236 A1* | 11/2019 | Le | G06F 40/30 | |
| 2019/0370412 A1* | 12/2019 | Hammontree | G06F 16/90332 | |
| 2019/0379618 A1* | 12/2019 | Rabbat | G06F 40/20 | |
| 2020/0075039 A1* | 3/2020 | Eleftheriou | G06V 40/20 | |
| 2020/0159826 A1* | 5/2020 | Lev Tov | G06F 40/35 | |
| 2020/0201939 A1* | 6/2020 | Doherty | G06N 5/04 | |
| 2020/0218781 A1* | 7/2020 | Takano | G06Q 30/016 | |
| 2021/0133553 A1* | 5/2021 | Van Den Heuvel | G06V 10/7788 | |
| 2021/0216723 A1* | 7/2021 | Zhang | G06F 18/214 | |

* cited by examiner

SYSTEM AND METHOD FOR IDENTIFYING SENTIMENT IN TEXT STRINGS

RELATED APPLICATIONS

This U.S. Application is a continuation application and claims the benefit and priority to the U.S. patent application Ser. No. 16/297,137 filed on Mar. 8, 2019 and is incorporated herein by reference in its entirety.

FIELD OF THE INVENTION

The present disclosure relates to sentiment analysis, and more particularly to systems and methods for identifying relevantly similar sentiment in text strings.

BACKGROUND

With the advancement of the computer and network technologies, various operations performed by users from different applications lead to extensive use of web services. This proliferation of the Internet and Internet based user activity continues to create a vast amount of digital content. For example, multiple users may provide feedback (e.g., responses to surveys, social media reviews, and opinions otherwise expressed during an interaction) about a business entity (e.g., a hotel or a restaurant) via different applications, such as mobile applications running on different platforms, as well as web-interfaces running on different browsers in different operating systems. Furthermore, users may also use different social media outlets to post their feedback about the business entity.

An application server for the business entity may store the feedback in a local storage device. Machine learning techniques can be used on the feedback to determine useful properties of the feedback, e.g. its sentiment. Sentiment analysis involves determining whether the text in feedback expresses positive, negative, neutral, or mixed sentiments. Such sentiment analysis typically uses a historic data set for training a sentiment analysis model. For example, a sentiment analysis model can be trained using a training data set that has been labeled by a user (e.g., the sentiments have been identified by the user). The trained model learns the associations between various language patterns and the corresponding sentiments in the training data set. The trained model is then used to analyze subsequent new data sets. When the trained model is used to analyze new data sets similar to the training data set, the model can achieve high accuracy.

Certain text strings can be embodied by very limited input, sometimes referred to as single judgment strings. Accurately assessing the sentiment of a single judgment input is difficult, prone to errors, and can lack general wide ranging applicability.

BRIEF SUMMARY

Embodiments discussed herein refer to systems and methods for identifying relevantly similar properties of text strings, e.g. their sentiment.

In one embodiment, a method is provided for receiving a text input and evaluating the text input with a first model to determine an initial sentiment and confidence thereof. If the confidence exceeds, or is equal to, a threshold, the method uses the initial sentiment. If the confidence is below the threshold, the method accesses a list including at least one secondary sentiment and evaluating the text input, in combination with each secondary sentiment, with a relevantly similar analysis model to generate a relevantly similar confidence (RSC) score corresponding to each secondary sentiment included in the list, wherein an evaluation of each generated RSC score determines whether to use the initial sentiment or a secondary sentiment as a resolved sentiment. The resolved sentiment associated with the text string is displayed.

In another embodiment, a method is provided for displaying a sentiment results page comprising a subset of a plurality of user responses, wherein each displayed user response displays a text string that formed a basis for a sentiment associated with the user response, displaying a sentiment correction overlay in response to receiving a user selection of one of the text strings, wherein the sentiment correction overlay enables a user to manually select a corrected sentiment for the user selected text string, receiving a user selection to select a corrected sentiment for the user selected text string, and temporarily incorporating the corrected sentiment for the user selected text string into a client specified corrected sentiment corrections database that is used by a relevantly similar analysis model to determine whether a text input is relevantly similar to any text strings contained in the database.

In yet another embodiment, a method is provided for training a relevantly similar analysis model that is operative to analyze a text input to determine whether the text input is relevantly similar to other text inputs. The training can include receiving a text seed, retrieving a plurality of text strings determined to be similar to the text seed from a database, assessing each of the plurality of text strings to identify which of the plurality of text strings are relevantly similar to the text seed, and using the text strings identified to be relevantly similar as training inputs for the relevantly similar analysis model. The method can use the relevantly similar analysis model to produce second order sentiment results for text inputs when first order sentiment results for the text inputs do not meet confidence criteria.

A further understanding of the nature and advantages of the embodiments discussed herein may be realized by reference to the remaining portions of the specification and the drawings.

BRIEF DESCRIPTION OF THE DRAWINGS

FIGS. 5A-5D show illustrative user interface screens according to various embodiments;

DETAILED DESCRIPTION

Figure 1:
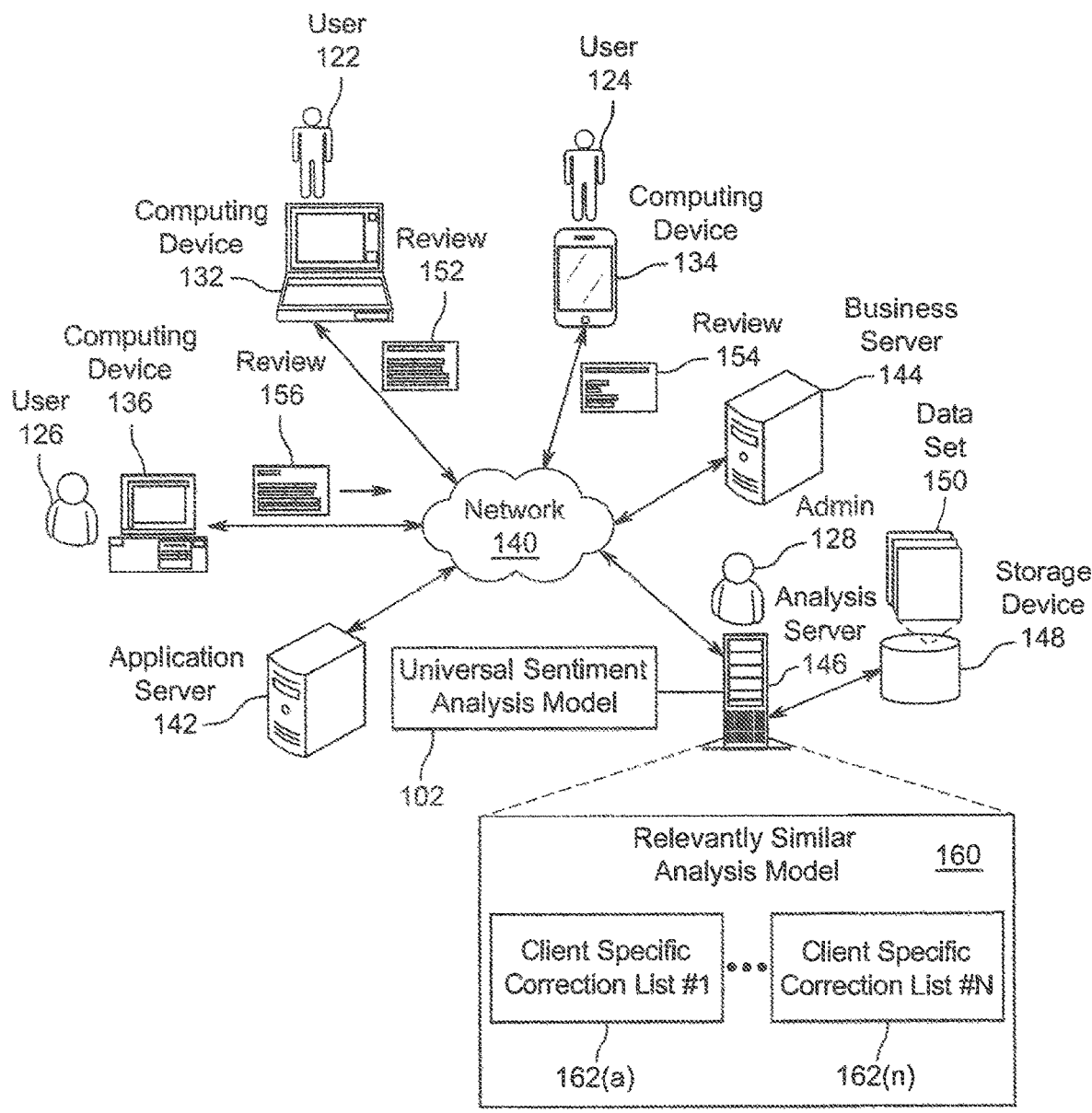
FIG. 1 illustrates a relevantly similar analysis system, in accordance with an embodiment.

Illustrative embodiments are now described more fully hereinafter with reference to the accompanying drawings, in which representative examples are shown. Indeed, the disclosed communication system and method may be embodied in many different forms and should not be construed as limited to the embodiments set forth herein. Like numbers refer to like elements throughout.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

In embodiments discussed herein, the problem of automatically determining portability of a sentiment analysis model is solved by providing a system that automatically and proactively performs portability analysis for the sentiment analysis model. Portability of a sentiment analysis model indicates whether the sentiment analysis model that is trained for one set of user feedback can be applied to another set of user feedback.

Due to ease of access via the Internet, a large number of users can provide feedback about a business entity using one or more distributed services (e.g., TripAdvisor, Facebook, Twitter, Yelp, etc.). Such feedback can include a textual description of the user's sentiments. A sentiment analysis model analyzes the text of the feedback to determine the sentiment expressed therein (e.g., positive, negative, neutral, or mixed sentiment). Typically, a universal sentiment analysis model is trained using a training data set, for which the sentiments have already been identified. The trained model is then used to determine user sentiments in subsequent new data sets.

The universal sentiment analysis model is used to process sentiment for data sets across multiple clients or parties in the same or different business domains. For example, the trained model may be used to assess sentiment for data associated with a first hotel client, a second hotel client, and several restaurant clients. Applying the analysis model to data sets across business domains may result in sentiment predictions that may not be entirely accurate. This may be because the context of the sentiments can be different from one business domain to the next or a new data set typically changes and evolves from the training data set (e.g., a new phenomenon may appear). If the new data set deviates significantly from the training data set, the accuracy of the universal sentiment analysis model may decrease. Embodiments discussed herein use the universal sentiment analysis model to obtain an initial sentiment judgement for a text input, and based on a confidence score of the initial sentiment, a secondary sentiment analysis model that is custom tailored to a particular client may be used to verify whether the initial sentiment or a secondary sentiment should be used as a resolved sentiment for the text input.

Inaccurate sentiment judgements can be manually corrected by an administrator who manually parses the feedback to determine the sentiment expressed in the feedback and compares the results with the sentiments provided by the universal sentiment analysis model. This requires the administrator to react to any inaccuracies by manually correcting the predicted sentiment. The corrections are then fed back into the universal sentiment analysis model and the data set is evaluated again using the updated information. Though, while the updated universal sentiment analysis model may be suitable for a data set applicable to a first domain, it may not be suitable for a data set applicable to a second domain. This can create an undesirable ripple affect across data sets for different domains. Embodiments discussed herein enable the administrator to correct sentiments on a client specific level for the secondary sentiment analysis model. This provides localized control over sentiment corrections that are specific to just a particular client, as opposed to exercising control over sentiment corrections that affect all clients. This way, the universal sentiment analysis model is not disturbed by corrections to sentiments, and can still be used universally across different domains of data sets, and is supported by the secondary sentiment analysis model when the confidence of a predicted sentiment does meet or exceed a confidence threshold.

FIG. 1 illustrates an exemplary relevantly similar analysis system, in accordance with an embodiment. In this example, a large number of users 122, 124, and 126 of a business entity provide feedback 152, 154, 10 and 156, respectively, about the business entity via a variety of computing devices 132, 134, and 136, respectively. Here, users 122, 124, and 126 can be considered as reviewers for the business entity. Examples of feedback include, but are not limited to, a survey with numerical indicators, a social media post, and feedback posted on a website. Such a business entity can be an entity in the hospitality business (e.g., a hotel, an event management company, a theme park, a transportation service provider, a cruise line, etc.).

These computing devices are coupled via a network 140, which can be a local or wide area network, to an application server 142 that provides a distributed service (e.g., TripAdvisor, Facebook, Twitter, Yelp, etc.). It should be noted that the feedback can be hosted on different servers associated with the corresponding service. The business entity can maintain a business server 144 coupled to network 140. Business server 144 can store the feedback information of the business entity provided by the distributed service. Such feedback information can include feedback of the business entity over a period of time (e.g., on a quarterly basis).

The business entity can run a universal sentiment analysis model 102 on an analysis server 146. Model 102 is initially trained with a training data set so that model 102 is able to identify sentiments in text inputs. The training set can be updated with new data so that model 102 is able to more accurately identify sentiment in each text input. For example, assume that a new data set 150 includes feedback 152, 154, and 156. Data set 150 can be a data set for a subsequent time period of the training data set or for a different business entity/domain than the training data set. Analysis server 146 can obtain data set 150 from business server 144 and store in a local storage device 148. Model 102 analyzes the text of feedback 152, 154, and 156 to determine the sentiment expressed in the feedback. For example, model 102 can determine how different phrases in the feedback correspond to one or more sentiments expressed in the feedback. Model 102 can generate a respective tag for feedback 152, 154, and 156. The tag can indicate whether the corresponding review expresses positive, negative, neutral, or mixed sentiment.

Data set 150 can change and evolve from the training data set. If data set 150 deviates significantly from the training data set, the accuracy of model 102 may decrease significantly. With existing technologies, such a decrement in accuracy can be detected based on an administrator 128's reactive intervention. Administrator 128 can be an administrator of the business entity. If administrator 128 observes that the sentiments provided by model 102 have not accurately reflected the sentiments in data set 150, administrator 128 manually parses feedback 152, 154, and 156 to determine the sentiments expressed in data set 150 and compare the result with the sentiments provided by model 102. As a result, model 102 requires administrator 128 to react to the decrement in accuracy and determine whether model 102 is produces satisfactory results across different data sets. For example, if feedback 152, 154, and 156 correspond to restaurant feedback, and model 102 is trained using hotel feedback, administrator 128 needs to manually determine 25 whether model 102 can be used to determine the sentiments in feedback 152, 154, and 156. Determining cross data set applicability for model 102, thus, relies on administrator 128's manual intervention. This process can be tedious and time-consuming, and may not be scalable. Moreover, even if model 102 produces results for different data sets that are similar to expected sentiments, such results may not be relevant.

Embodiments discussed herein use a relevantly similar analysis (RSA) model 160 to eliminate the need for ensuring that universal sentiment model 102 is applicable across different data sets and to ensure that the results are relevant to each client. RSA model 160 can evaluate a text input to determine how relevant and similar the text input is to a particular client's specific corrected sentiments. That is, RSA model 160 determines how relevantly similar each text input is to corrected sentiments contained in a particular one of several client specific posting lists. Each client specific posting list is pertinent only to one particular client. Model 160 can include a number of client specific posting lists 1612(a) through 1612(n). For example, a hotel client #1 may have its own posting list and hotel client #2 may have its own posting list. This way, each client can update its client specific posting list by populating it with corrected sentiments. This way, each client can benefit from using the data set used to power universal sentiment analysis model 102 to obtain an initial judgement sentiment, and based on a confidence of the initial judgement sentiment, RSA model 160 can be leveraged to confirm whether initial judgement sentiment is the correct resolved sentiment or whether a secondary sentiment—obtained from the client specific posting list—is the correct resolved sentiment.

RSA model 160 can serve as a secondary prediction model to universal model 102 for predicting the sentiment of a text input. This permits universal model 102 to serve its role as the initial judge of sentiment, and if the initial judgement does not meet or exceed a confidence threshold, RSA model 160 serves its role as a secondary judge of sentiment. In effect, universal model 102 can serve as a first order predictor of sentiment and RSA model 160 can serve as a second order predictor of sentiment. This first and second order approach to predicting sentiment enables universal model 102 to be universally applied to all text inputs, irrespective of which client the text input is associated. Using universal model 102 as the initial judge of sentiment is advantageous because it leverages a relatively large training data set that continually evolves over time with additional data points obtained from one or more or all clients that use model 102. For text inputs that result in initial judgements that do not meet or exceed a confidence threshold, RSA module 160 can be leveraged to resolve the sentiment. Because RSA module 160 can access a client specific posting list, it is able to ensure a relevantly similar sentiment is predicted for the text string.

The text strings being used for inputs can vary in size. For example, the text strings can include limited text strings or expansive text strings. Limited text strings can include a single word up to a full sentence. Limited text strings can include a phrase, a fragment, or incomplete sentence. In some embodiments, a limited text string can be referred to as a one-shot text string. Expansive text strings can include one or more full sentences, such as a paragraph, for example. Determining the sentiment is more difficult with limited text strings than expansive text strings. In addition, determining whether a sentiment is relevant is even more difficult with limited text strings. This is because there is not as much context for the universal model to base its prediction on to produce the initial judgment.

Figure 2:
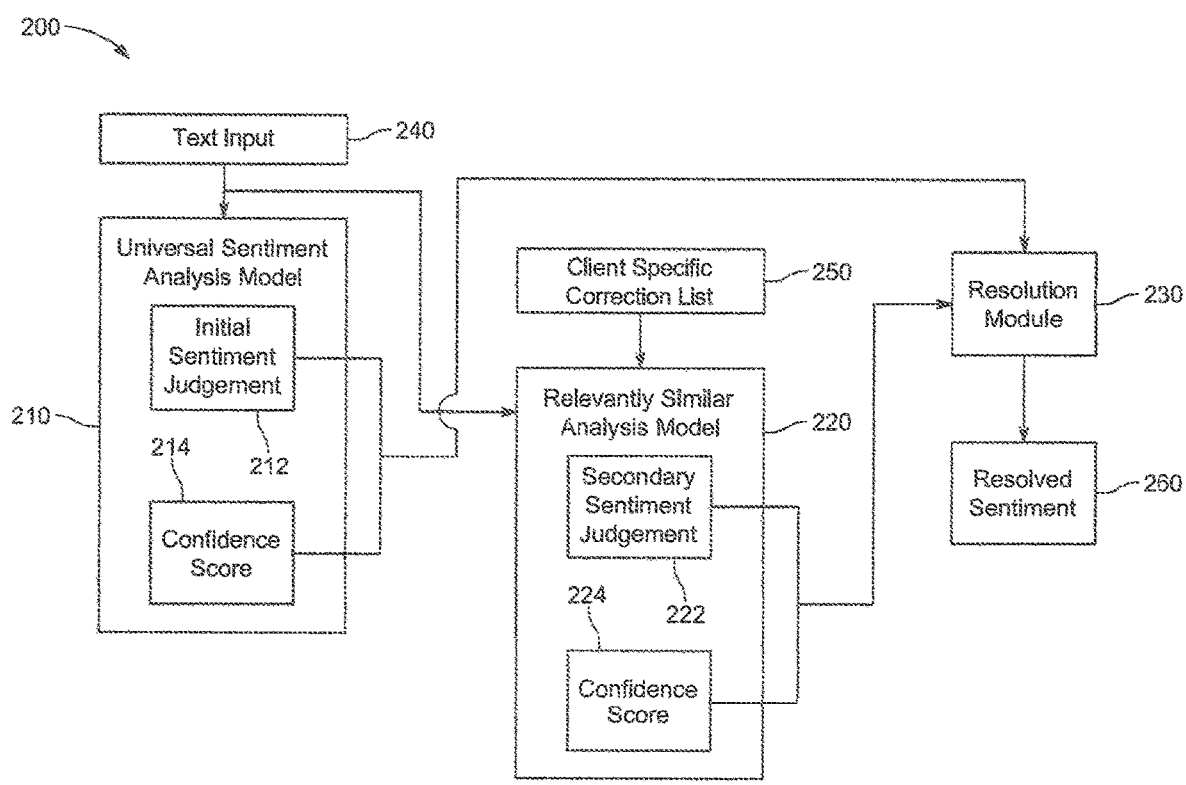
FIG. 2 shows an illustrative block diagram of sentiment analysis system according to an embodiment.

FIG. 2 shows an illustrative block diagram of sentiment analysis system 200 according to an embodiment. System 200 may run, for example, on analysis server 146. System 200 can include universal sentiment analysis (USA) model 210, RSA model 220, resolution module 230, text input 240, client specific correction list 250, and resolved sentiment 260. USA model 210 and RSA model 220 may be similar or the same as model 102 and model 160, respectively. Text input 240 can be provided to both USA model 210 and RSA model 220. USA model 210 can generate initial judgement sentiment 212 and initial judgment confidence score 214 based on text input 240. As discussed above, USA model generated initial judgement sentiment 212 using a relatively large training data set that is applicable across many business domains, including across all clients associated with those contained in the client specific correction list 250. RSA model 220 can generate secondary judgement sentiment 222 and relevantly similar confidence score 224 based on text input 240. As discussed above, RSA model 220 can leverage client specific correction list 250 to yield secondary judgement sentiment 222. Initial judgement sentiment 212, initial judgment confidence score 214, secondary judgement sentiment 222, and relevantly similar confidence score 224 may be provided to resolution module 230. Resolution module 230 can determine whether initial judgement sentiment 212, secondary judgement sentiment 222, or a tertiary judgement sentiment (not shown) should be selected as resolved sentiment 260. Resolution 230 module can make the determination based on initial judgment confidence score 214 and relevantly similar confidence score 224.

Figure 3:
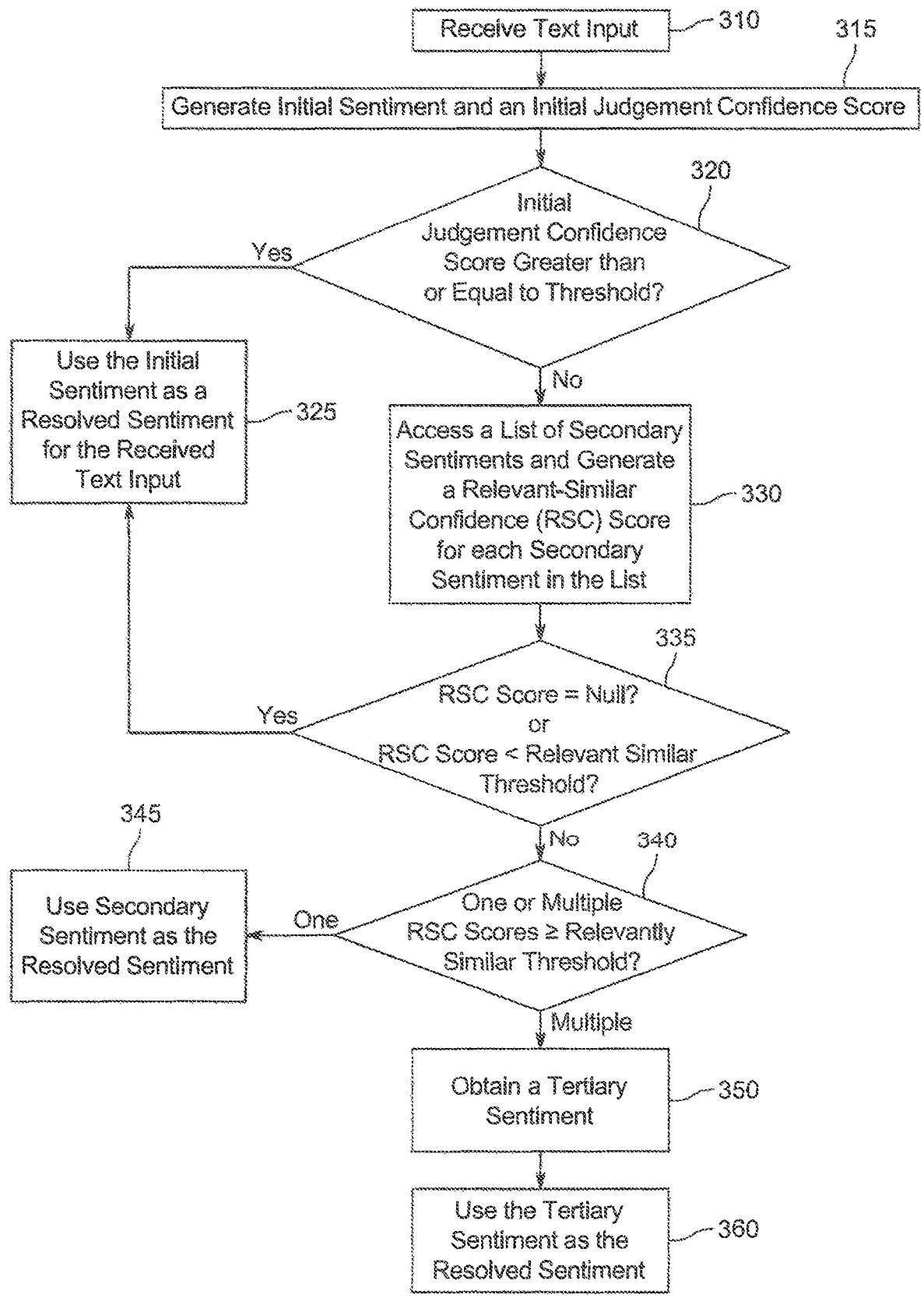
FIG. 3 shows illustrative process that uses sentiment analysis system of FIG. 2 according to an embodiment.

FIG. 3 shows illustrative process 300 that uses sentiment analysis system 200 according to an embodiment. Beginning at step 310, a text input is received. For example, the text input can be obtained from feedback submitted by a patron of a client using sentiment analysis system 200 to analyze feedback. In some embodiments, the text input can be a limited text input. At step 315, an initial judgement sentiment and an initial judgement confidence score are generated using, for example, USA model 220. At step 320, a determination is made whether the initial judgement confidence score is greater than or equal to a threshold. For example, the threshold may be set to indicate whether the predicted sentiment of text input 240 obtained by USA model 220 is accurate enough to be used as a resolved sentiment. If the determination at step 320 is YES, the initial judgement sentiment is used as the resolved sentiment for the received text input (as shown in step 325). If the determination at step 320 is NO, process 300 proceeds to step 330. At step 330, a list designated for containing at least one secondary judgement sentiment is accessed and a relevantly similar confidence (RSC) score for each secondary judgement sentiment contained in the list is generated using, for example, RSA model 220. The secondary judgement sentiment can be obtained from the client specific correction list (e.g., list 250) and the RSC score is determined for each item in the list. Thus, in some embodiments, a list of RSC scores can be generated (e.g., one per sentiment included in client specific correction list 250). Each RSC score can be determined by comparing the text input with each secondary judgement.

At step 335, a determination is made as to whether the RSC score is equivalent to a null score or zero or less than a relevantly similar threshold. A null score or zero may occur, for example, if there are no user specified corrections included in the list. If the determination at step 335 is YES, process 300 returns to step 325 and the initial judgement sentiment is used as the resolved sentiment. If the determination at step 335 is NO, another determination is made at step 340 as to whether there is only one RSC score equal to or greater than a relevantly similar threshold or if there are multiple RSC scores equal to or greater than the relevantly similar threshold. If the determination is ONE, process 300 can use the secondary sentiment as the resolved sentiment (as shown in step 345). If only one RSC score satisfies the determination at step 340, this may indicate that there is a perfect match between the input text and the client specific correction list or that there is a guarantee that the secondary sentiment should be the resolved sentiment. If, however, there are multiple RSC scores that satisfy the determination at step 340 process 300 may obtain a tertiary sentiment at step 350 and use the tertiary sentiment as the resolved sentiment at step 360. The tertiary sentiment may be used for "grey" area RSC scores that indicate a high likelihood that secondary sentiment may be the correct sentiment for use as the resolved sentiment, but factors exist that call into question absolute accuracy of the secondary sentiment. The tertiary sentiment can be resolved using the multiple secondary sentiments determined to be greater than or equal to the relevantly similar threshold. If desired, if the tertiary sentiments are deemed unsatisfactory, a third sentiment can be obtained by requesting that the administrator supply the sentiment to be used as the resolved sentiment.

It should be understood that the step shown in FIG. 3 are merely illustrative and that additional steps may be added, steps may be omitted, and the order of the steps can be rearranged.

Figure 4:
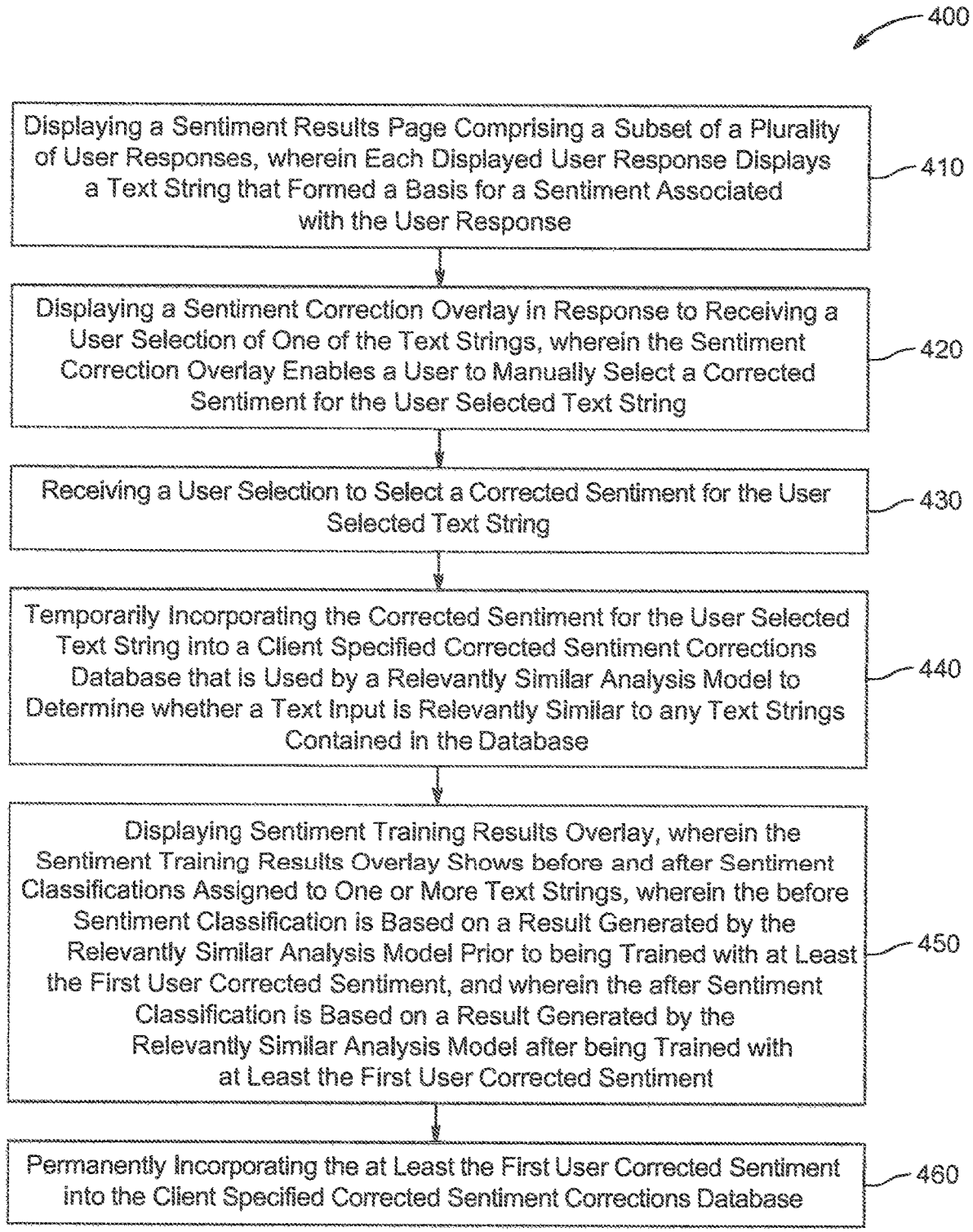
FIG. 4 shows illustrative process for enabling an administrator to enter sentiment corrections for populating a client specific correction list according to an embodiment.
Figure 5A:
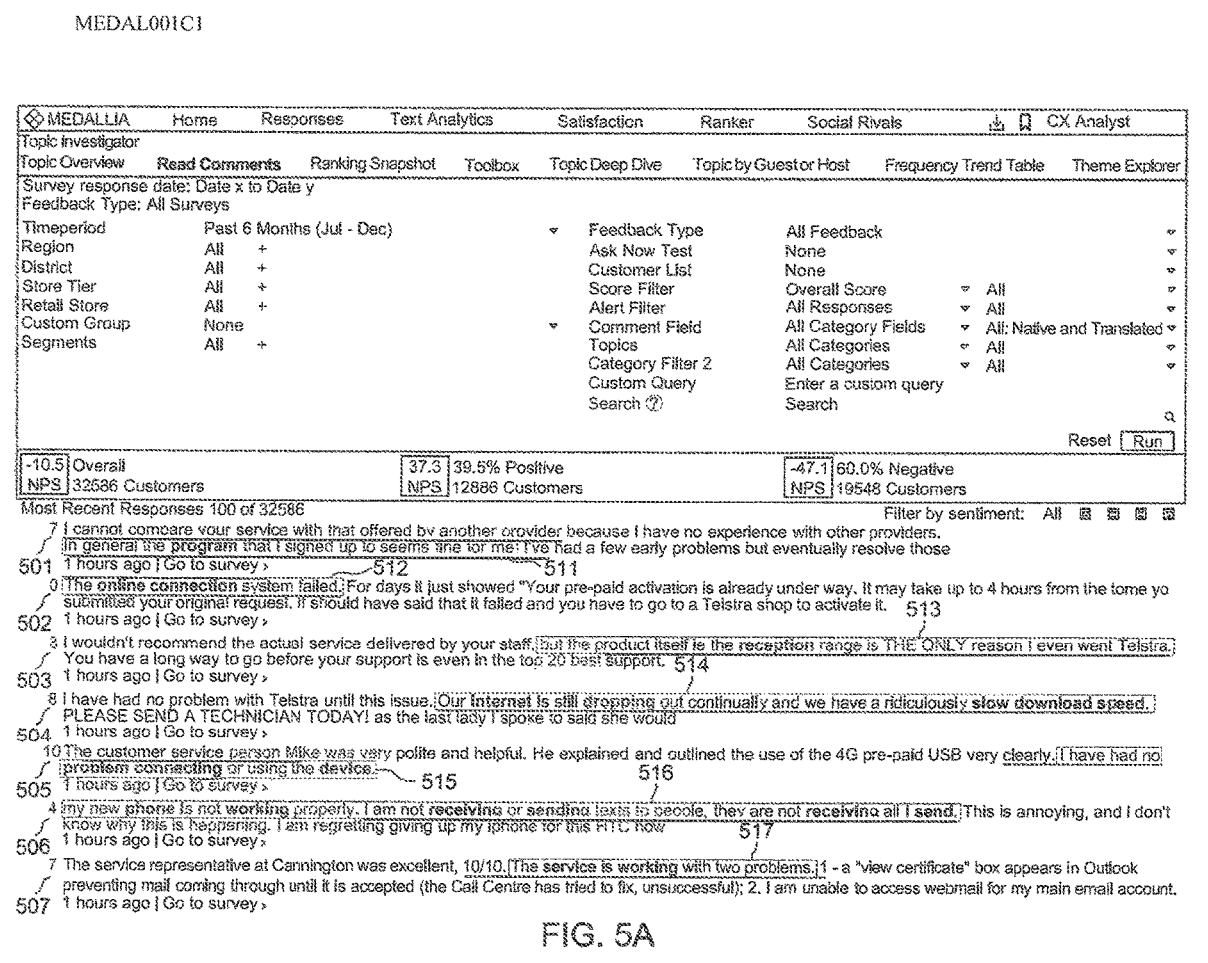
Figure 5B:
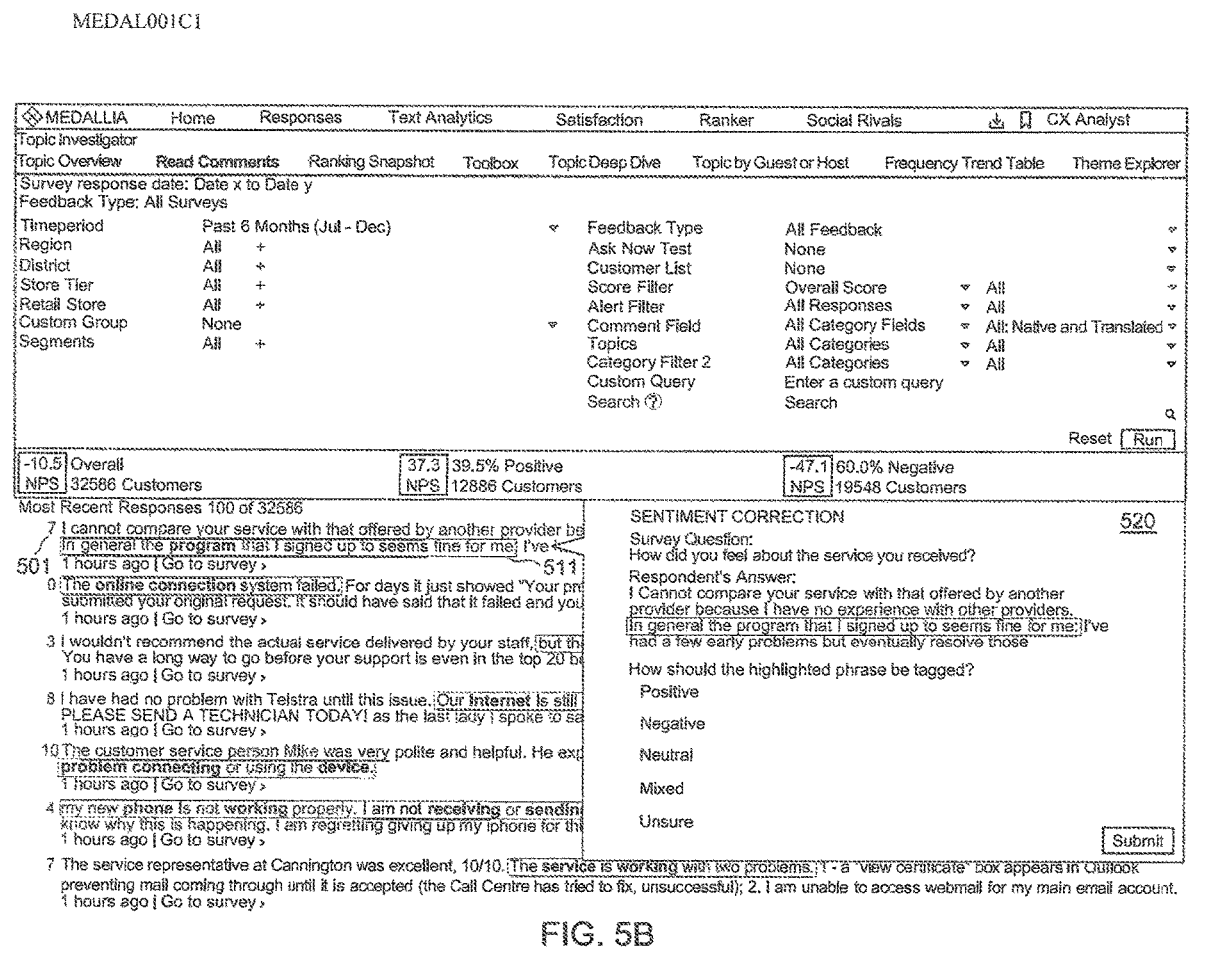

FIG. 4 shows illustrative process 400 for enabling an administrator to enter sentiment corrections for populating a client specific correction list according to an embodiment. Process 400 is discussed in connection with FIGS. 5A-5D, which shows illustrative user interface screens according to various embodiments. Starting at step 410, a sentiment results page including a subset of a plurality of user responses is displayed. Each displayed user response displays a text string that formed a basis for a sentiment associated with the user response. See, for example, FIG. 5A, which shows user interface screen 500 with several responses 501-507, each with a highlighted portion indicating the resolved sentiment, shown as 511-517, respectively. Each highlighted portion may be color coded to indicate whether the resolved sentiment is classified as positive, neutral, or negative.

Figure 5C:
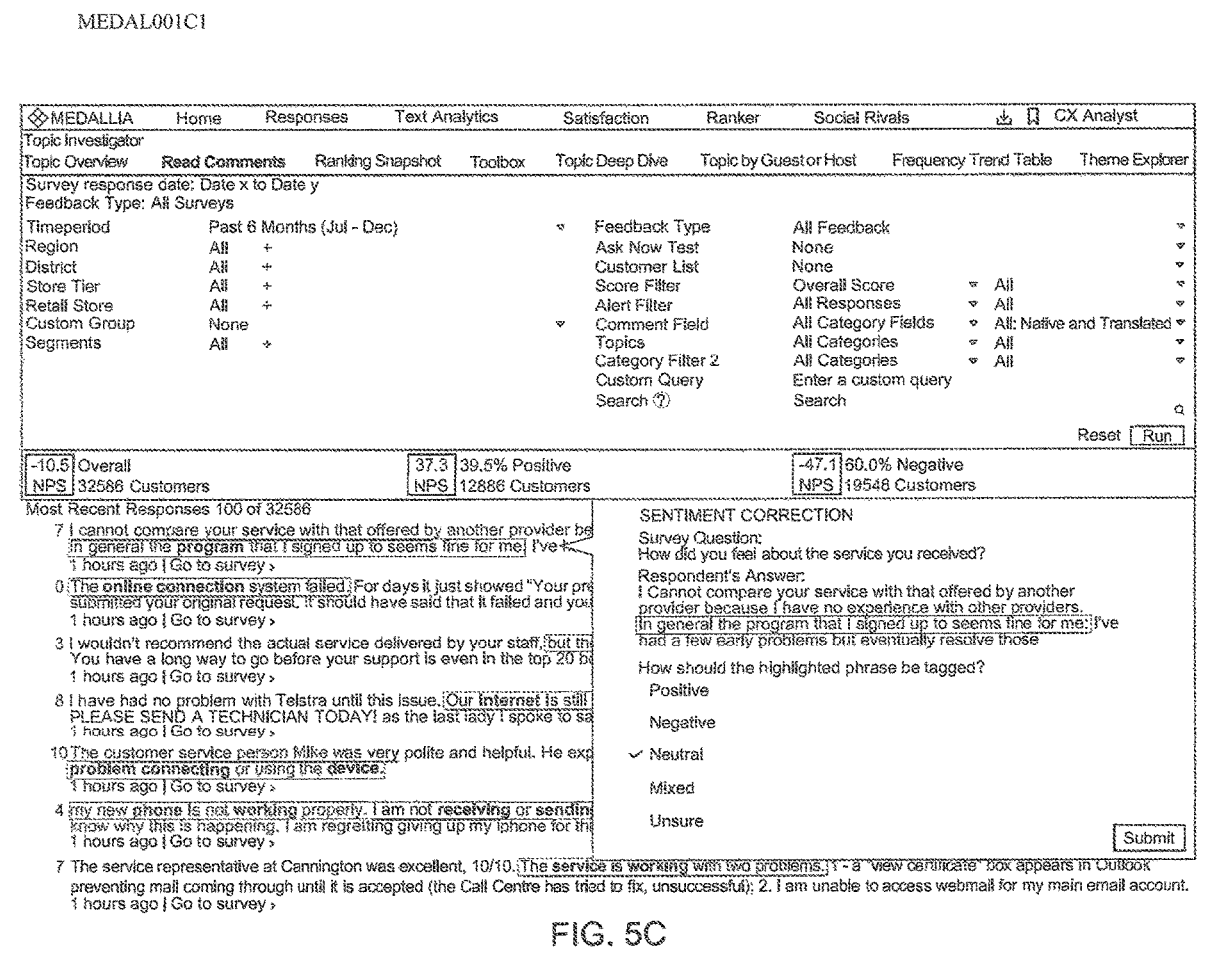

At step 420, a sentiment correction overlay can be displayed in response to receiving a user selection of one of the text strings, wherein the sentiment correction overlay enables a user to manually select a corrected sentiment for the user selected text string. For example, referring to FIG. 5B, sentiment correction overlay 520 can be displayed in response to selection of highlighted region 511. Overlay 520 can include the survey question, the respondent's answer, and several selectable options for how the sentiment associated with the highlighted phrase should be corrected. At step 430, a user selection is received to select a corrected sentiment for the user selected text string. For example, FIG. 5C shows that the user selected "neutral" as the selected sentiment. After the user selects the corrected sentiment for the highlighted text, the user can select the submit button to enter the corrected sentiment into the client specific corrections list. In step 440, the corrected sentiment for the user selected text string can be incorporated into a client specified corrected sentiment corrections database that is used by a relevantly similar analysis model to determine whether a text input is relevantly similar to any text strings contained in the database. If desired, the user can submit multiple sentiment corrections for incorporation into the client specific corrections database.

Figure 5D:
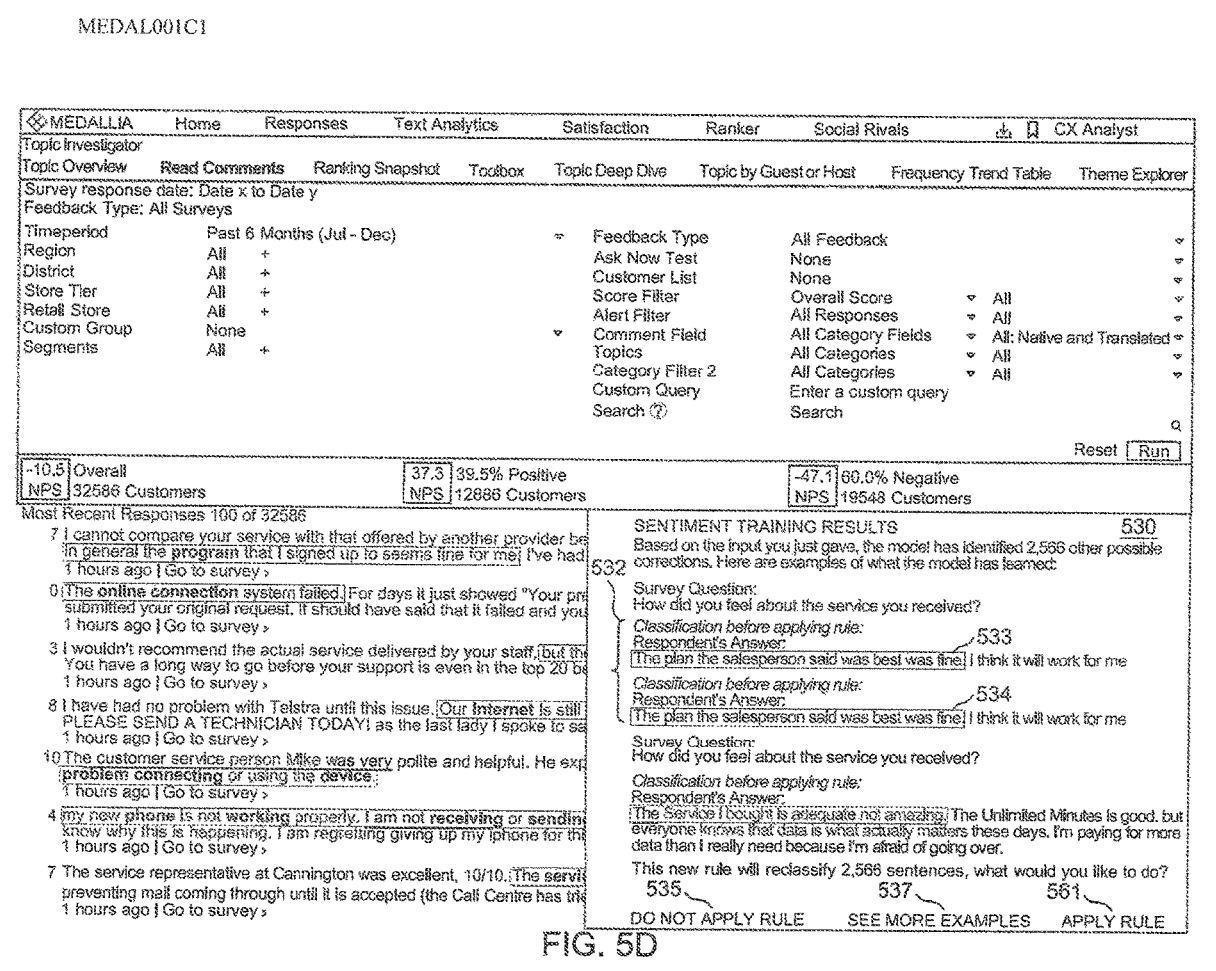

Step 450 shows displaying sentiment training results overlay. The display shows the results of applying an original sentiment annotation or determination and the results after applying a correction to that annotation or determination. In some embodiments, the displayed results overlay shows before and after sentiment classifications assigned to one or more text strings, wherein the before sentiment classification is based on a result generated by the relevantly similar analysis model prior to being trained with at least the first user corrected sentiment, and wherein the after sentiment classification is based on a result generated by the relevantly similar analysis model after being trained with at least the first user corrected sentiment. FIG. 5D shows overlay 530 of sentiment training results based on the corrected sentiments entered by the user. Overlay 530 indicates how many other sentiment corrections can be applied to text inputs contained in the client's dataset if the user decides to apply the selected sentiment corrections to the RSA model. Overlay 530 also provides examples of sentiment correction results that would be applied if the user decides to apply the corrected sentiments. For example, overlay shows before and after rule application for text segment 532. The prior rule application indicates that highlighted region 533 is green (not shown) to signify a positive sentiment. After rule application indicates that highlighted region 534 is grey (not shown) to signify a neutral sentiment. The user can select "do not apply rule" 535, "apply rule" 536, or "see more examples" 537. If the user selects apply rule 536, the at least the first user corrected sentiment may be permanent incorporated into the client specified corrected sentiment corrections database, as shown by step 460. If the user selects do not apply rule 535, the user corrections may be discarded and not stored in the client specific corrections database. If the user selects see more examples 537, additional examples of before and after sentiment classifications may be displayed.

It should be understood that the step shown in FIG. 4 are merely illustrative and that additional steps may be added, steps may be omitted, and the order of the steps can be rearranged. For example, the process for sentiment correction can be applied to any kind of classification where the user can tell whether a classification is relevantly similar. As one specific example, instead of analyzing sentiment, the process can be applied to classifying the content of a statement such as, for example, determining whether a statement is offensive or not (e.g., does the statement contain profanity or other words in a context that would be offensive to the reader?).

Figure 6:
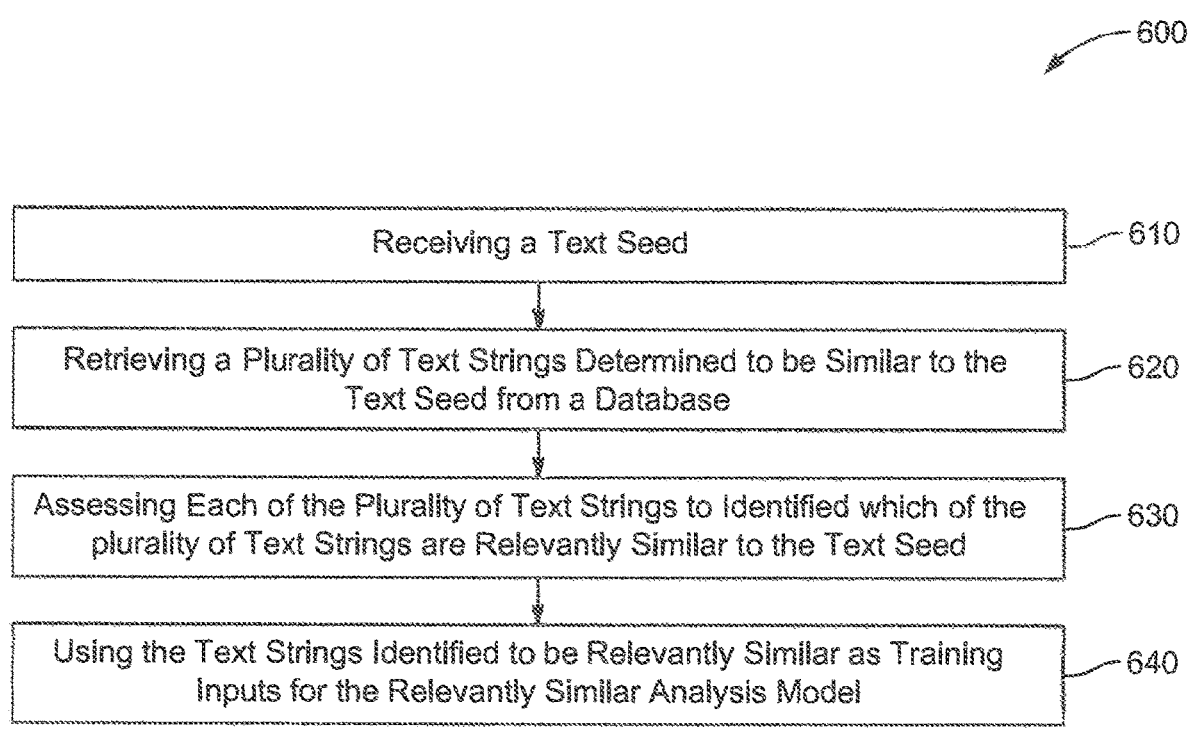
FIG. 6 shows illustrative process of training a relatively similar model according to an embodiment.

The RSA model can be trained so that it is able to generate the secondary sentiments according to an embodiment. FIG. 6 shows illustrative process 600 according to an embodiment. Process 600 can begin at step 610 by receiving a text seed. At step 620, several text strings determined to be similar to the text seed can be retrieved from a database. Each of the text strings are assessed to identify which of the text strings are relevantly similar to the text seed, as shown by step 630. In some embodiments, an administrator may provide inputs as to which text strings are relevantly similar. At step 640, the text strings identified to be relevantly similar can be used as training inputs for the relevantly similar analysis model. After the relevantly similar analysis model is trained, it can be used to produce second order sentiment results for text inputs when first order sentiment results for the text inputs do not meet confidence criteria.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A computer-implemented method comprising:
   receiving an input;
   evaluating the input with a first model to determine an initial sentiment and confidence thereof;
   if the confidence is greater than a threshold, using the initial sentiment;
   if the confidence is lower than the threshold, accessing a list of secondary sentiments and evaluating the input for each of the secondary sentiments;
   if the confidence is lower than the threshold, generating a relevantly similar confidence (RSC) score associated with each of the secondary sentiments; and
   if the confidence is lower than the threshold, determining whether to use the initial sentiment or one sentiment of the secondary sentiments based on the generated RSC scores.

2. The computer-implemented method of claim 1, wherein the method further comprises:
   selecting a sentiment based on the determining; and
   displaying the selected sentiment associated with the input.

3. The computer-implemented method of claim 1, wherein the list of secondary sentiments is a client specific posting list comprising a plurality of correction inputs, wherein each RSC score is based on a determination of relevance and similarity of the input to each correction input of the plurality of correction inputs.

4. The computer-implemented method of claim 3, wherein each correction input of the plurality of correction inputs has been previously provided by a user.

5. The computer-implemented method of claim 1, wherein when the RSC score is null or less than another threshold, the initial sentiment is selected as a resolved sentiment.

6. The computer-implemented method of claim 1, wherein when only one RSC score is equal to or greater than another threshold, the secondary sentiment corresponding to that RSC score equal to or greater than the another threshold is selected as a resolved sentiment.

7. The computer-implemented method of claim 1, wherein when multiple RSC scores are equal to or greater than another threshold, the method further comprises using secondary sentiments corresponding to the multiple RSC scores that are equal to or greater than the another threshold as input factors to select a tertiary sentiment as a resolved sentiment.

8. The computer-implemented method of claim 7, further comprising:
   receiving a user input as the tertiary sentiment.

9. The computer-implemented method of claim 1, wherein the list of the secondary sentiments is associated with one client, and wherein a relevance similar analysis model used to generate the RSC score only accesses the list of secondary sentiments associated with the one client when generating the RSC scores for the input for the one client.

10. The computer-implemented method of claim 1, wherein the initial sentiment and the RSC scores are generated in real-time.

11. The computer-implemented method of claim 1, wherein the list of secondary sentiments is populated by client administered entries.

12. The computer-implemented method of claim 1, wherein the input is a limited text input.

13. The computer-implemented method of claim 1, wherein a relevance similar analysis model used to generate the RSC scores is trained with a dataset used by a first model, and wherein the relevance similar analysis model uses the dataset and the list of secondary sentiments to evaluate the input to generate the RSC scores.

14. A computer-implemented method comprising:
   receiving an input at an application server from at least one remotely-connected computing device over a wide-area network;
   transmitting the input from the application server to a remotely-connected analysis server for analysis; and
   receiving analysis result from the analysis server, wherein the analysis result is based on running an initial sentiment model and determining an initial confidence score associated with the initial sentiment model, and wherein the analysis result is a selection of the initial sentiment based on an initial sentiment model and output of the initial sentiment if the initial confidence score is above a predetermined threshold, and wherein the analysis result is based on another sentiment model and another confidence score associated therewith if the initial confidence score is below the predetermined threshold and wherein the analysis result is a selection and output by a resolution module between the initial sentiment based on the initial sentiment model and an another sentiment based on the another sentiment model.

15. The computer-implemented method of claim 14, wherein the analysis result is received by the application server over a network.

16. The computer-implemented method of claim 14 further comprising sending data associated with the analysis result from the application server to the at least one remotely-connected computing device over the wide-area network.

17. The computer-implemented method of claim 16, wherein the data is rendered on a display of the at least one remotely-connected computing device, wherein the rendition includes a plurality of user responses received from the at least one remotely-connected computing device, and wherein each user response of the plurality of user responses includes a text string that was a basis of the analysis result by the analysis server.

18. The computer-implemented method of claim 14, wherein the initial sentiment model is a universal sentiment analysis model.

\* \* \* \* \*